United States Patent [19]
Dean et al.

[11] Patent Number: 4,929,677
[45] Date of Patent: May 29, 1990

[54] ACETOPHENONE BASED BISPHENOL POLYARYLATE RESINS

[75] Inventors: Barry D. Dean, Broomall; Robert G. Gastinger, Brookhaven, both of Pa.

[73] Assignee: Arco Chemical Technology, Inc., Wilmington, Del.

[21] Appl. No.: 165,649

[22] Filed: Mar. 8, 1988

Related U.S. Application Data

[63] Continuation of Ser. No. 848,658, Apr. 7, 1986, abandoned.

[51] Int. Cl.$^5$ .................... E08L 67/02; E08L 35/06
[52] U.S. Cl. .................................... 525/151; 525/68; 525/132
[58] Field of Search .................... 525/132, 175, 151

[56] References Cited

U.S. PATENT DOCUMENTS 3,351,624 11/1967 Conix .................... 528/176
4,542,187 9/1985 Dean .................... 525/132

Primary Examiner—Patricia Short
Attorney, Agent, or Firm—Dennis M. Kozak

[57] ABSTRACT

A moldable polymer composition comprising an acetophenone based bisphenol polyarylate resin and a monovinyl aromatic/N-arylmaleimide copolymer is disclosed. In one embodiment, the N-arylmaleimide containing copolymer is rubber modified by the incorporation of an elastomeric polymer during the formation of the copolymer. In another embodiment, the moldable polymer composition is rubber modified by the incorporation of an elastomeric polymer using any conventional method of blending.

3 Claims, No Drawings

ACETOPHENONE BASED BISPHENOL POLYARYLATE RESINS

This application is a continuation of application Ser. No. 848,658, filed Apr. 7, 1986, now abandoned.

This invention relates to thermoplastic resins.

More specifically, this invention relates to an engineering thermoplastic resin containing an acetophenone based bisphenol polyarylate resin and a monovinyl aromatic/N-arylmaleimide copolymer.

Polyarylate blends with vinyl aromatic copolymers are taught in U.S. Pat. Nos. 3,792,118; 4,259,458; 4,286,075; and 4,327,012. A polyarylate blended with a vinyl aromatic/maleic anhydride copolymer is taught in U.S. Pat. No. 4,126,602. An aliphatic polyester containing up to 10 mole % of aromatic dicarboxylic acid units blended with vinyl aromatic copolymers including vinyl aromatic/ $\alpha,\beta$ - unsaturated cyclic imides is taught in U.S. Pat. No. 4,388,446. A polymer composition comprising a polyarylate resin and a vinyl aromatic/maleimide copolymer in which the maleimide content of the copolymer is from about 40 to about 50 mole % is taught in U.S. Pat. No. 4,542,187. And, U.S. Pat. No. 4,501,693 teaches a composition comprising a polycarbonate derived from bis(3,5-dimethyl-4-hydroxyphenyl) sulfone and a second dihydric phenol and a styrenic resin.

This invention provides a novel thermodynamically miscible polymer composition which is a fully compatible combination that exhibits a single phase and a single well defined glass temperature value.

According to this invention there is provided a moldable polymer composition comprising a polyarylate containing in mole percent, from about 15 to about 35 isophthalic acid or its reactive derivative, from about 15 to about 35 terephthalic acid or its reactive derivative and about 50 1,1-bis(4-hydroxyphenyl)-1-phenyl ethane; and a copolymer containing in mole percent from more than about 60 to about 87 recurring units of a monovinyl aromatic monomer and from about 13 to less than about 40 recurring units of an N-arylmaleimide monomer, wherein the resulting polymer composition exhibits a single phase and a single glass transition temperature value.

Also, according to this invention, there is provided a method for producing a molded composition which exhibits a single phase and a single glass transition temperature value which method comprises (a) forming a polymer composition comprising a polyarylate containing in mole percent, from about 15 to about 35 isophthalic acid or its reactive derivative, from about 15 to about 35 terephthalic acid or its reactive derivative and about 50 1,1-bis(4-hydroxyphenyl)1-phenyl ethane, and a copolymer containing in mole percent from more than about 60 to about 87 recurring units of monovinyl aromatic monomer and from about 13 to less than about 40 recurring units of N-arylmaleimide monomer; and (b) molding the resulting polymer composition.

According to this invention there is also provided a molded composition comprising a single continuous phase, said single continuous phase being a polymer composition comprising a polyarylate containing in mole percent, from about 15 to about 35 isophthalic acid or its reactive derivative, from about 15 to about 35 terephthalic acid or its reactive derivative and about 50 1,1-bis(4-hydroxyphenyl)-1-phenyl ethane; and a copolymer containing in mole percent from more than about 60 to about 87 recurring units of monovinyl aromatic monomer and from about 13 to less than about 40 recurring units of N-arylmaleimide monomer.

In one embodiment, the polymer composition of this invention comprises from about 1 to about 99 weight percent of the polyarylate material and from about 99 to 1 weight percent of the monovinyl aromatic/N-arylmaleimide copolymer.

In another embodiment, the impact resistance of the polymer composition is enhanced by incorporating, using conventional methods, an elastomeric polymer into the monovinyl aromatic/N-arylmaleimide copolymer during the formation of the copolymer.

In another embodiment, the impact resistance of the polymer composition is enhanced by the addition of an elastomeric polymer using any suitable method of blending.

In yet another embodiment, the 1,1-bis(4-hydroxyphenyl)-1-phenyl ethane is replaced in whole or in part by 1,1-bis(4-hydroxyphenyl)-diphenyl methane, 1,1-bis(4-hydroxyphenyl) fluorenone, or mixtures thereof.

To produce the polyarylate material used in the practice of this invention, a combination of isophthalic acid and terephthalic acid or their reactive derivatives can be used.

Suitable reactive derivatives of isophthalic acid include isophthaloyl dichloride, diphenyl isophthalate, and the like, and their mixtures.

Suitable reactive derivatives of terephthalic acid include terephthaloyl dichloride, diphenyl terephthalate, and the like, and their mixtures.

The 1,1-bis(4-hydroxyphenyl)-1-phenyl ethane, which is preferred in the practice of the invention, is also known as bisphenol acetophenone or bisphenol ACP. Methods for producing bisphenol ACP are well known and include the condensation of phenol with ether acetophenone or phenylacetylene in the presence of a suitable catalyst.

The 1,1-bis(4-hydroxyphenyl)-1-phenyl ethane polymer has the following structure:

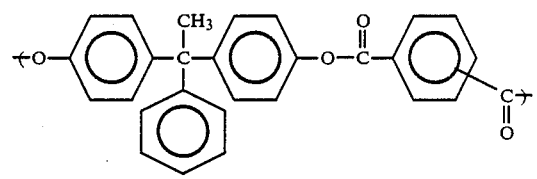

The 1,1-bis(4-hydroxyphenyl) diphenyl methane polymer has the following structure:

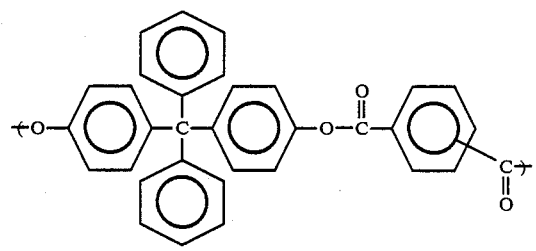

The 1,1-bis(4-hydroxyphenyl)fluorenone polymer has the following structure:

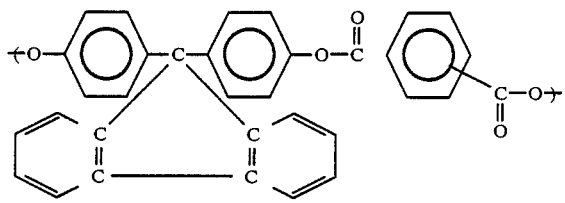

To produce a copolymer useable in the practice of this invention, any suitable monylvinyl aromatic monomer and N-arylmaleimide monomer can be used. Suitable vinyl aromatic monomers include: styrene, p-methylstyrene, t-butylstyrene, and the like and their mixtures The preferred vinyl aromatic monomer is styrene. Suitable N-arylmaleimides include N-phenylmaleimide, N-(4-t-butyl)phenylmaleimide, N-(2-chloro) phenylmaleimide, N-(4-methoxy) phenylmaleimide, and the like and their mixtures. N-phenylmaleimide is preferred.

The copolymer of a monovinyl aromatic monomer and an N-arylmaleimide monomer will contain in mole percent more than about 60 to about 87 recurring units of the monovinyl aromatic monomer and from about 13 to less than about 40 recurring units of the N-arylmaleimide monomer. Preferably, the copolymer will contain from about 65 to about 87 mole percent recurring units of the monovinyl aromatic monomer and from about 13 to about 35 recurring units of N-arylmaleimide monomer. Most preferably, the copolymer will contain from about 75 to about 87 mole percent recurring units of the monovinyl aromatic monomer and from about 13 to about 25 mole percent recurring units of the N-arylmaleimide monomer.

As stated above, the monovinyl aromatic/N-arylmaleimide copolymer can be rubber modified to enhance the impact resistance of the polymer composition by incorporating into the copolymer an elastomeric polymer during the formation of the copolymer using any conventional method of incorporation. One suitable method of incorporation is to dissolve the elastomeric polymer in the vinyl aromatic monomer followed by metered addition of the N-arylmaleimide comonomer using any suitable method of blending. Suitable elastomeric polymers are polybutadiene, EPDM rubbers, styrene/butadiene block polymers, acrylic rubbers, e.g., poly(n-butylacrylate) and other elastomers which exhibit glass transition temperatures less than or equal to 0° C. In addition, the impact resistance of the polymer composition can be enhanced, by the addition of an elastomeric polymer, as a separate component, to the blend of the polyarylate and the monovinyl aromatic/N-arylmaleimide copolymer using any suitable method of blending. Suitable elastomeric polymers include: polybutadiene, EPDM rubbers, styrene/butadiene block polymers, acrylic rubbers and other elastomers which exhibit glass transition temperature values less than or equal to 0° C. Also suitable for use as impact modifiers for the polymer composition of the invention are grafted rubbers where the graft species is styrene/acrylonitrile copolymer, styrene/N-arylmaleimide copolymer, styrene/maleimide copolymer, as well as other species capable of being grafted onto an elastomeric polymer.

If employed, the amount of elastomeric polymer will be employed in an effective amount to enhance the impact resistance of the moldable composition as compared to the impact resistance of the moldable composition in the absence of the elastomeric polymer. Typically, the elastomeric polymer will be employed in an amount of from about 1 to about 20 parts per each 100 parts by weight of the polymer composition excluding the weight of the elastomeric polymer.

The number average molecular weight (Mn) of the polyarylate of this invention is within the range of from about 20,000 to about 80,000 as determined by gel permeation chromatography. The number average molecular weight (Mn) of the monovinyl aromatic/N-arylmaleimide copolymer should be between 100,000 to 500,000; most preferably between 100,000 to 250,000 as determined by gel permeation chromatography.

The moldable polymer compositions of this invention can also include other ingredients such as extenders, processing aids, pigments, mold release agents and the like, for their conventionally employed purpose. Also, reinforcing fillers in amounts sufficient to impart reinforcement can be used, such as titanium dioxide, potassium titanate and titanate whiskers, glass flakes and chopped glass fibers.

The following examples serve to demonstrate the invention. Evaluation of material properties was performed based on the following ASTM standard tests: flexural modulus (D-790), tensile strength (D-638), elongation (D-638), notched Izod (D-256), and deflection temperature under load (DTUL), ⅛" at 264 psi, (D-648). Gardner falling weight index was determined using a 1¼" diameter orifice and an 8-pound ½" diameter weight. Glass transition temperature values were determined by differential scanning colorimetry.

EXAMPLE 1

This example demonstrates the preparation of a polyarylate material suitable for use in this invention.

A 1-liter resin kettle equipped with a mechanical stirrer, pressure equalizing addition funnel and a nitrogen inlet/outlet system was charged with about 350 grams of water, about 20.6 grams of sodium hydroxide and about 50 gram of 1,1-bis(4-hydroxy phenyl)-1-phenyl ethane (Bisphenol ACP). The aqueous solution was cooled to 18° C. and about 0.05 gram of benzyltriethylammonium chloride (phase transfer catalyst) was added. The pressure equalizing addition funnel was charged with about 34.8 grams of a 50:50 molar mixture of isophthaloyl dichloride and terephthaloyl dichloride dissolved in about 400 grams of dichloromethane. The acid chloride solution was added to the aqueous solution with rapid agitation. The internal temperature was maintained at between 18 to 22° C. for about a three-hour period. The polymer was recovered by precipitation into methanol. The properties of the resulting polyarylate material are listed in Table 1.

TABLE 1

| | |
|---|---|
| Tg (°C.) | 255 |
| Mn (GPC) | 47,800 |
| Mw/Mn | 2.2 |
| Flexural Modulus (psi) | 325,000 |
| DTUL (°F.) | 408 |
| Notched Izod (ft-lbs/in) | 3.2 |

$M_w$ = weight average molecular weight

EXAMPLE 2

This example demonstrates the preparation of three monovinyl aromatic/N-arylmaleimide copolymers (designated I, II, and III) suitable for use in this invention. Each copolymer was separately prepared as follows, using the amounts of materials listed in Table 2. The letters A-F listed below correspond to columns A-F in Table 2.

A 1-liter resin kettle was equipped with a mechanical stirrer, pressure equalizing addition funnel, and a nitrogen inlet/outlet system. The resin kettle was charged with (A) grams of styrene monomer and (B) grams of benzoyl peroxide. The pressure equalizing addition funnel was charged with (C) grams of a styrene/ N-phenylmaleimide comonomer solution. The reaction temperature (D) was set and the addition of the styrene/N-phenylmaleimide solution was started and maintained at a controlled rate for a given period of time (E). Once the appropriate solids level (F) had been reached, the reaction was terminated with a tetrahydrofuran solution of hydroquinone. The polymer was recovered by precipitation into methanol. The three S/N-PMI copolymers values were analyzed to determine their glass transition temperature values, number average molecular weights and elemental nitrogen percentages. The data obtained are shown in Table 3.

TABLE 2

| Example 2 Copolymer No. | (A) Styrene Monomer | (B) Benzoyl Peroxide | (C) Styrene /N-PMI Comonomer Soln. | (D) Reaction Temp. (°C.) | (E) Time (hrs.) | (F) % Solids |
|---|---|---|---|---|---|---|
| I | 200 g | 0.4 g | 260/40 g | 96 | 1.2 | 43 |
| II | 200 g | 0.4 g | 240/60 g | 95 | 0.9 | 38 |
| III | 100 g | 0.4 g | 220/80 g | 96 | 0.7 | 34 |

TABLE 3

| Example 2 Copolymer No. | % N | % N-PMI Wt. | mole | Mn | Mw/Mn | Tg (°C.) |
|---|---|---|---|---|---|---|
| I | 1.63 | 20.1 | 13 | 117,000 | 2.4 | 132 |
| II | 2.58 | 32.1 | 21 | 111,000 | 2.5 | 153 |
| III | 3.88 | 48.0 | 35 | 102,000 | 2.7 | 173 |

EXAMPLE 3

This example demonstrates the thermodynamic miscibility of the polyarylate material prepared in Example 1 with the three S/N-PMI copolymers (I, II and III) prepared in Example 2.

Three separate blends (Compositions A, B, and C) were prepared in a Brabender mixing apparatus at temperatures between 260° to 300° C. and samples of the three polymer blends were separately analyzed to obtain their glass transition temperature values. Molded specimens of Compositions A, B, and C were measured for deflection temperature under load (DTUL). The amounts of materials blended, glass transition temperature values and DTUL values for each composition are shown in Table 4.

TABLE 4

| Composition | Control | A | Control | B | Control | C | Control |
|---|---|---|---|---|---|---|---|
| Polyarylate (Example 1) | 100 | 50 | 0 | 50 | 0 | 50 | 0 |
| S/N-PMI Copolymer I | 0 | 50 | 100 | 0 | 0 | 0 | 0 |
| S/N-PMI Copolymer II | 0 | 0 | 0 | 50 | 100 | 0 | 0 |
| S/N-PMI Copolymer III | 0 | 0 | 0 | 0 | 0 | 50 | 100 |
| Tg (°C.) | 255 | 190 | 132 | 201 | 153 | 211 | 173 |
| DTUL (°F.) | 408 | 302 | 215 | 334 | 249 | 354 | 284 |

EXAMPLE 4

This example demonstrates the preparation of a thermodynamically miscible composition of this invention comprised of 50 weight % of the polyarylate material of Example 1 and 50 weight % of a rubber modified styrene/N-phenylmaleimide copolymer. The rubber modified S/N-PMI copolymer was prepared by dissolving the rubber in the styrene monomer followed by metered addition of the NPMI monomer. The resulting rubber modified S/N-PMI copolymer contained of 18 weight % polybutadiene rubber and 23.5 weight % N-PMI content based on the styrenic copolymer matrix with the the balance being styrene.

A blend of the polyarylate of Example 1 and the resulting rubber modified S/N-PMI copolymer (Composition D) was prepared in the Brabender mixing apparatus at 275° C. for five minutes. Specimens were compression molded to evaluate both deflection temperature under load and notched Izod impact strength. The results obtained are shown in Table 5.

TABLE 5

| Composition | Control | D | Control |
|---|---|---|---|
| Polyarylate (Example 1) | 0 | 50 | 100 |
| Rubber Modified S/N-PMI (Example 4) | 100 | 50 | 0 |
| Tg (°C.) | 136 | 201 | 255 |
| DTUL (°F.) | 213 | 304 | 408 |
| Notched Izod (ft-lbs/in) | 1.8 | 4.1 | 3.2 |

EXAMPLE 5

This example demonstrates the preparation of a thermodynamically miscible composition of this invention containing 50 weight % of the polyarylate material of Example 1 and 50 weight % of another rubber modified styrene/N-phenylmaleimide copolymer. The rubber modified S/N-PMI copolymer was prepared by dissolving the rubber in the styrene monomer followed by the metered addition of the N-PMI monomer. The rubber modified S/N-PMI copolymer contained 18 weight % EPDM rubber and 30 weight % N-phenylmaleimide content based on the styrenic copolymer matrix with the balance being styrene.

A blend of the polyarylate of Example 1 and the resulting rubber modified S/N-PMI copolymer was prepared (Composition E) in a Brabender mixing apparatus at 285° C. for five minutes. Specimens were compression molded to evaluate both deflection temperature under load and notched Izod impact strength. The results are shown in Table 6.

TABLE 6

| Composition | Control | E | Control |
|---|---|---|---|
| Polyarylate (Ex. 1) | 0 | 50 | 100 |
| Rubber Modified S/N-PMI (Ex. 5) | 100 | 50 | 0 |

TABLE 6-continued

| Composition | Control | E | Control |
| --- | --- | --- | --- |
| Tg (°C.) | 151 | 210 | 255 |
| DTUL (°F.) | 250 | 315 | 408 |
| Notched Izod (ft-lbs/in) | 3.7 | 6.6 | 3.2 |

It will be evident from the foregoing that various modification can be made to this invention. Such, however, are considered as being within the scope of the invention.

What is claimed is:

1. A moldable polymer composition comprising:
   (a) from about 1 to about 99 weight percent of a polyarylate containing in mole percent from about 15 to about 35 isophthalic acid or a reactive derivative of isophthalic acid, from about 15 to about 35 terephthalic acid, or a reactive derivative of isophthalic acid and about 50 of at least one polyarylate material selected from the group consisting of 1,1-bis(4-hydroxyphenyl)-1-phenylethane; 1,1-bis(4-hydroxyphenyl)-diphenyl methane; and 1,1-bis(4-hydroxyphenyl) fluorenone; and
   (b) from about 99 to about 1 weight percent of a copolymer containing in mole percent from about 75 to about 87 recurring units of a monovinyl aromatic monomer and from about 13 to about 25 recurring units of an N-arylmaleimide monomer, wherein the polyarylate and the copolymer are fully compatible upon blending and the resulting polymer composition exhibits a single phase and a single glass transition temperature value.

2. The composition of claim 1 in which the monovinyl aromatic monomer of copolymer (b) is selected from the group consisting of styrene, p-methylstyrene, and t-butylstyrene.

3. The composition of claim 1 in which the N-arylmaleimide monomer of copolymer (b) is selected from the group consisting of N-phenylmaleimide, N-(4-t-butyl)phenylmaleimide, N-(2-chloro)phenylmaleimide, and N-(4-methoxy)phenylmaleimide.

* * * * *